(12) United States Patent
Chang et al.

(10) Patent No.: US 12,510,791 B2
(45) Date of Patent: Dec. 30, 2025

(54) ARRAY SUBSTRATE AND LIQUID CRYSTAL DISPLAY PANEL

(71) Applicant: HKC CORPORATION LIMITED, Shenzhen (CN)

(72) Inventors: Hongyan Chang, Shenzhen (CN); Bing Han, Shenzhen (CN); Shishuai Huang, Shenzhen (CN); Zhenya Li, Shenzhen (CN); Guangjia Wang, Shenzhen (CN); Haoxuan Zheng, Shenzhen (CN)

(73) Assignee: HKC CORPORATION LIMITED, Shenzhen (CN)

( * ) Notice: Subject to any disclaimer, the term of this patent is extended or adjusted under 35 U.S.C. 154(b) by 0 days.

(21) Appl. No.: 18/727,080

(22) PCT Filed: Dec. 7, 2022

(86) PCT No.: PCT/CN2022/137153
§ 371 (c)(1),
(2) Date: Jul. 6, 2024

(87) PCT Pub. No.: WO2023/142694
PCT Pub. Date: Aug. 3, 2023

(65) Prior Publication Data
US 2024/0419043 A1    Dec. 19, 2024

(30) Foreign Application Priority Data
Jan. 26, 2022 (CN) .................. 202210095728.1

(51) Int. Cl.
*G02F 1/13* (2006.01)
*G02F 1/1362* (2006.01)
(Continued)

(52) U.S. Cl.
CPC .. *G02F 1/136286* (2013.01); *G02F 1/136218* (2021.01); *H10D 86/443* (2025.01);
(Continued)

(58) Field of Classification Search
CPC .......... H01L 27/1244; H01L 31/02165; H10K 59/126; G02F 1/136286; G02F 1/136218;
(Continued)

(56) References Cited

U.S. PATENT DOCUMENTS 10,295,858 B2 * 5/2019 Woo .................. G02F 1/136286
10,545,588 B2 * 1/2020 Li ........................... G06F 3/041
(Continued)

FOREIGN PATENT DOCUMENTS

CN        106200169 A      12/2016
CN        105607358 B   *  8/2018   ....... G02F 1/136209
(Continued)

OTHER PUBLICATIONS

International Search Report issued Feb. 10, 2023, on a PCT Application No. PCT/CN2022/137153, filed Jul. 12, 2022. English Translation attached.
(Continued)

*Primary Examiner* — Ida M Soward
(74) *Attorney, Agent, or Firm* — Franklin & Associates International Inc; Matthew F. Lambrinos

(57) ABSTRACT

The present application relates to an array substrate (1) and a liquid crystal display panel. The driving array layer of the array substrate (1) includes a scanning line (G) extending along a first direction (X) and a data line (D) extending along a second direction (Y); the transparent metal layer (14) includes a first pixel electrode (141a) and a second pixel electrode (141b) which are alternately provided along a first direction (X) and a second direction (Y), and a shielding common electrode (142) located in an interval region of the first pixel electrode (141a) and the second pixel electrode (141b); the color-resistance layer (13) includes color-resistance units (131) respectively corresponding to the first pixel electrode (141a) and the second pixel electrode (141b), and (Continued)

in the second direction (Y), a first overlap width (W1) between two adjacent color-resistance units (131) corresponding to the target area is greater than a second overlap width (W2) between two adjacent color-resistance units (131) at the remaining positions in the target area formed by the interval between the first pixel electrode (141*a*) and the second pixel electrode (141*b*) intersecting with the scanning line (G). The array substrate can avoid electrical performance problems such as short circuits, crosstalk, etc. due to the remaining underexposed transparent metal layer.

15 Claims, 7 Drawing Sheets

(51) Int. Cl.
*H10D 86/40* (2025.01)
*H10D 86/60* (2025.01)
*G02F 1/1335* (2006.01)
*H10F 77/30* (2025.01)
*H10K 59/126* (2023.01)

(52) U.S. Cl.
CPC ....... *H10D 86/60* (2025.01); *G02F 1/133512* (2013.01); *G02F 1/136209* (2013.01); *H10F 77/337* (2025.01); *H10K 59/126* (2023.02)

(58) Field of Classification Search
CPC ......... G02F 1/136209; G02F 1/133512; G02F 1/136222; G02F 1/1343; G02F 1/1368; H10D 86/443; H10D 86/60; H10F 77/337
See application file for complete search history.

(56) References Cited

U.S. PATENT DOCUMENTS

| | | | | |
|---|---|---|---|---|
| 11,249,351 | B2 * | 2/2022 | Xian | G02F 1/136209 |
| 11,513,407 | B2 * | 11/2022 | Xian | G02F 1/0316 |
| 11,521,419 | B2 * | 12/2022 | Zeng | G06V 40/1318 |
| 2004/0080679 | A1 * | 4/2004 | Song | G02F 1/136227 349/43 |
| 2004/0135939 | A1 | 7/2004 | Luo | |
| 2008/0239227 | A1 | 10/2008 | Fan Jiang et al. | |
| 2011/0261307 | A1 * | 10/2011 | Shin | G02F 1/13439 349/123 |
| 2014/0009709 | A1 * | 1/2014 | Lim | H10H 20/01 438/30 |
| 2016/0026291 | A1 * | 1/2016 | Zhao | G06F 3/0412 345/174 |
| 2016/0147122 | A1 * | 5/2016 | Hwang | G02F 1/133512 257/72 |
| 2016/0216543 | A1 * | 7/2016 | Hong | G02F 1/136209 |
| 2016/0282690 | A1 * | 9/2016 | Hong | G02F 1/136286 |
| 2016/0328074 | A1 * | 11/2016 | Peng | G06F 3/0412 |
| 2017/0176817 | A1 * | 6/2017 | Tseng | G02F 1/13394 |
| 2017/0299908 | A1 * | 10/2017 | Peng | G02F 1/13338 |
| 2017/0322471 | A1 * | 11/2017 | Jeong | G02F 1/136209 |
| 2018/0122888 | A1 * | 5/2018 | Jung | H10K 59/1213 |
| 2019/0129549 | A1 * | 5/2019 | Yeh | G02F 1/1368 |

FOREIGN PATENT DOCUMENTS

| | | | | |
|---|---|---|---|---|
| CN | 108983518 | A | 12/2018 | |
| CN | 209182609 | U | 7/2019 | |
| CN | 110632801 | A | 12/2019 | |
| CN | 111290182 | A | 6/2020 | |
| CN | 111580317 | A | 8/2020 | |
| CN | 111736399 | A * | 10/2020 | ........... H10D 86/451 |
| CN | 111812899 | A | 10/2020 | |
| CN | 113703234 | A | 11/2021 | |
| CN | 114299894 | A | 4/2022 | |
| TW | 201030433 | A | 8/2010 | |
| WO | 2021232556 | A1 | 11/2021 | |
| WO | 2021237863 | A1 | 12/2021 | |

OTHER PUBLICATIONS

Written Opinion issued Feb. 21, 2023, on a PCT Application No. PCT/CN2022/137153, filed Jul. 12, 2022. English Translation attached.

* cited by examiner

ARRAY SUBSTRATE AND LIQUID CRYSTAL DISPLAY PANEL

CROSS-REFERENCE TO RELATED APPLICATIONS

This application is a national phase of International Patent Application No. PCT/CN2022/137153 filed on Dec. 7, 2022, which claims priority to Chinese Patent Application 202210095728.1, entitled "ARRAY SUBSTRATE AND LIQUID CRYSTAL DISPLAY PANEL", filed on Jan. 26, 2022, the entire contents of which are incorporated herein by reference.

FIELD

The present application relates to the technical field of displays, in particular to an array substrate and a liquid crystal display panel.

BACKGROUND

The Color-filter on Array (COA) technology is an integrated technology that directly makes the color-resistance on the array substrate, which can reduce the alignment error between the color film substrate and the array substrate. In addition, a data line is provided between adjacent color-resistances, and a Black Matrix (BM) is provided between the adjacent color-resistances corresponding to the color film substrate side for shading the data line to improve the contrast ratio of the liquid crystal display panel.

According to the Dataline BM Less (DBS, no black matrix above the data line) technology, on the basis of COA, the BM above the data line is eliminated, a transparent metal layer is provided on the array substrate side to form a shielding electrode to shield the electric field above the data line, and the potential of the shielding electrode is made the same as the potential of the common electrode on the color film substrate, so that the corresponding liquid crystal molecules above the data line always remain in an undeflected state, thereby achieving the effect of shading. A pixel electrode is also formed on the transparent metal layer, and an electric field for driving the deflection of liquid crystal molecules is formed between the pixel electrode and a common electrode on the color film substrate.

In order to form a patterned transparent metal layer, a Photo Resin (PR) is coated on the transparent metal layer to perform an exposure process. When PR is coated, it will color-resistance unit boundaries corresponding to a region where a gate line is located are stacked at an overlapping position, so that the PR at the overlapping position is thicker than the PR at other regions, and metal oxides with insufficient exposure may remain at the overlapping position after exposure, resulting in poor electrical performance problems such as short circuit and crosstalk, and affecting the display effect of the liquid crystal display panel.

SUMMARY

An object of the present application is to provide an array substrate and a liquid crystal display panel, which can avoid leaving an underexposed transparent metal layer at the overlapping position between two adjacent color-resistance units, prevent short circuit, crosstalk and other poor electrical performance problems, and improve the display effect of the liquid crystal display panel.

On the one hand, the embodiments of the present application provide an array substrate comprising a driving array layer, a color-resistance layer and a transparent metal layer successively formed on a substrate base; the driving array layer comprising a scanning line extending along a first direction and a data line extending along a second direction, and the first direction and the second direction intersecting each other; the transparent metal layer comprising a first pixel electrode and a second pixel electrode which are alternately provided along a first direction and a second direction; wherein the transparent metal layer further comprises a shielding common electrode located in an interval region of the first pixel electrode and the second pixel electrode, the shielding common electrode comprises a transverse electrode and a longitudinal electrode which are electrically connected to each other, the longitudinal electrode is provided corresponding to the data line, and the transverse electrode is provided corresponding to the scanning line; the color-resistance layer comprises color-resistance units respectively corresponding to a first pixel electrode and a second pixel electrode; in the second direction, in a target area formed by an interval between the first pixel electrode and the second pixel electrode intersecting with a scanning line, a first overlap width between two adjacent color-resistance units corresponding to the target area is greater than a second overlap width between two adjacent color-resistance units at the remaining positions.

On the other hand, embodiments of the present application also provide a liquid crystal display panel comprising the array substrate of any one of the foregoing; an opposed substrate provided opposite to the array substrate, wherein the opposed substrate is provided with a shading layer in a region corresponding to a transverse electrode of the array substrate; and a liquid crystal layer provided between the array substrate and the opposed substrate.

According to the array substrate and the liquid crystal display panel provided in the embodiments of the present application, by increasing the overlap width between two adjacent color-resistance units in the target area formed by the interval between the first pixel electrode and the second pixel electrode and the scanning line, the array substrate can avoid the metal oxide with insufficient exposure remaining at the overlapping position between two adjacent color-resistance units, prevent short circuit, crosstalk and other poor electrical performance problems of the transparent metal layer, and improve the display effect of the liquid crystal display panel.

BRIEF DESCRIPTION OF THE DRAWINGS

Features, advantages, and technical effects of exemplary embodiments of the present application will be described below with reference to the accompanying drawings. In the drawings, like parts are provided with like reference numerals. The drawings are not drawn to scale and are merely intended to illustrate relative positional relationships. Layer thicknesses at certain locations are exaggerated for ease of understanding, and layer thicknesses in the drawings do not represent the scale of actual layer thicknesses.

Figure 1:
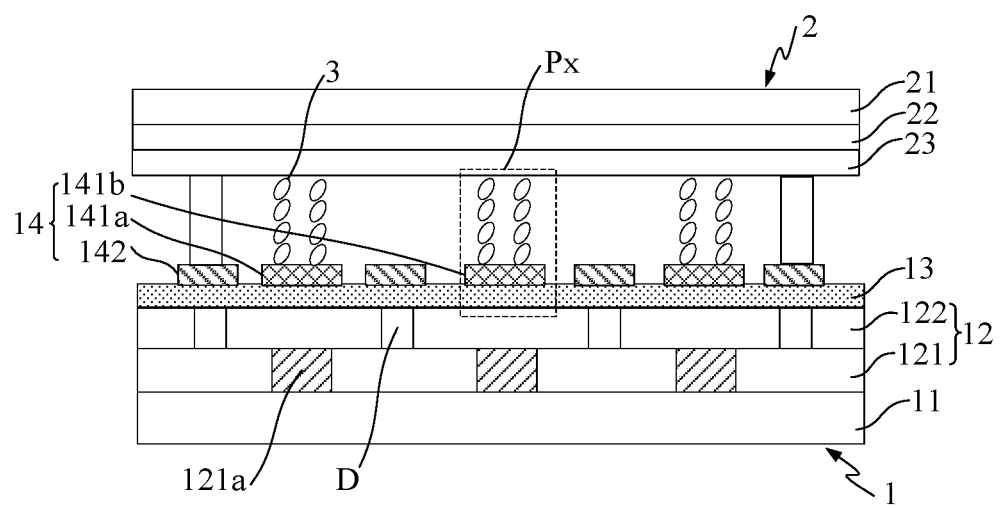
FIG. 1 shows a schematic structural diagram of a liquid crystal display panel according to an embodiment of the present application.

DESCRIPTION OF REFERENCE NUMERALS 1. array substrate; Px, sub-pixel; X, first direction; Y, second direction;
11. substrate base; 12. driving array layer; 121. first metal layer; 121a. array common electrode; 122. second metal layer; D. data line; G. scanning line; G1. first scanning line; G2. second scanning line;
13. color-resistance layer; 131. color-resistance unit; W1. first overlap width; W2. second overlap width; W3. third overlap width; 131a. flat portion; 131b. slope portion; 131c. convex portion;
14. transparent metal layer; 141a. first pixel electrode; 141b. second pixel electrode; 142. shielding common electrode; 142a. transverse electrode; 142b. longitudinal electrode; L. straight line portion; M. oblique line portion; 15. passivation; T. thin film transistor; T1. first thin film transistor; T2. second thin film transistor; L1. first trace; L2. second trace;
2. opposed substrate; 21. opposed supporting base; 22. shading layer; 23. opposed common electrode; 3. liquid crystal layer; In. interval region; I. interval; T. target area; R. remaining position.

DETAILED DESCRIPTION

Features and exemplary embodiments of various aspects of the present application are described in detail below. In the following detailed description, numerous specific details are set forth in order to provide a thorough understanding of the present application. However, it will be apparent to a person skilled in the art that the present application may be practiced without some of these specific details. The following description of the embodiments is merely exemplary of the invention to provide a better understanding of the invention. In the drawings and the following description, at least some well-known structures and techniques are not shown in order to avoid unnecessarily obscuring the present application. In addition, the dimensions of the region structures may be exaggerated for clarity. Further, the features, structures, or characteristics described below may be combined in any suitable manner in one or more embodiments.

FIG. 1 shows a schematic structural diagram of a liquid crystal display panel according to an embodiment of the present application.

Referring to FIG. 1, an embodiment of the present application provides a liquid crystal display panel comprising: an array substrate 1, an opposed substrate 2 provided opposite to the array substrate 1, and a liquid crystal layer 3 provided between the array substrate 1 and the opposed substrate 2. The liquid crystal layer 3 comprises a plurality of liquid crystal molecules, which are generally rod-like and can both flow like a liquid and have certain crystal characteristics.

When liquid crystal molecules are in an electric field, their alignment direction changes according to changes in the electric field.

Since the liquid crystal display panel is a non-emission type light-receiving element, a light source needs to be provided by a backlight module provided on the backlight side thereof. The liquid crystal display panel controls the rotation of the liquid crystal molecules of the liquid crystal layer 3 by applying driving voltages on the array substrate 1 and the opposed substrate 2 to refract light provided by the backlight module to create a picture. In order to display a color picture, an array of thin film transistors is usually prepared on the array substrate 1 for driving the rotation of liquid crystal molecules to control the display of each sub-pixel Px.

As shown in FIG. 1, the opposed substrate 2 includes an opposed supporting base 21, a shading layer 22, and an opposed common electrode 23 formed in this order in the thickness direction. The array substrate 1 adopts a Color-filter on Array (COA) technology and a Dataline BM Less (DBS) architecture, that is to say, a plurality of color-resistance units 131 of the color-resistance layer 13 are directly fabricated on one side of the array substrate 1, and a shielding common electrode 142 is formed on the transparent metal layer 14 on one side of the array substrate 1 to shield the electric field above the data lines, and make the potential of the shielding common electrode 142 be the same as the potential of the opposed common electrode 23 on the opposed substrate 2, so that the corresponding liquid crystal molecules above the data lines always remain in an undeflected state, thereby achieving the effect of shading. At the same time, a shading layer 22, i.e., a Black Matrix (BM), is provided between the adjacent color-resistance units 131 corresponding to the side of the opposed substrate 2 for shielding the data lines to improve the contrast ratio of the liquid crystal display panel.

In addition, the transparent metal layer 14 is also formed with a plurality of pixel electrodes. When the thin film transistor of the array substrate 1 is turned on by a signal applied to the gate electrode, a signal applied to the data line is applied to the pixel electrode. Thus, an electric field of a predetermined intensity is generated between the pixel electrode and the opposed common electrode 23, and the orientation of the liquid crystal molecules can be changed by applying different voltages, thereby adjusting the transmittance of light and displaying an image.

Specific structures of the array substrate provided by the embodiments of the present application are described in further detail below with reference to the accompanying drawings.

Embodiment I

Figure 2:
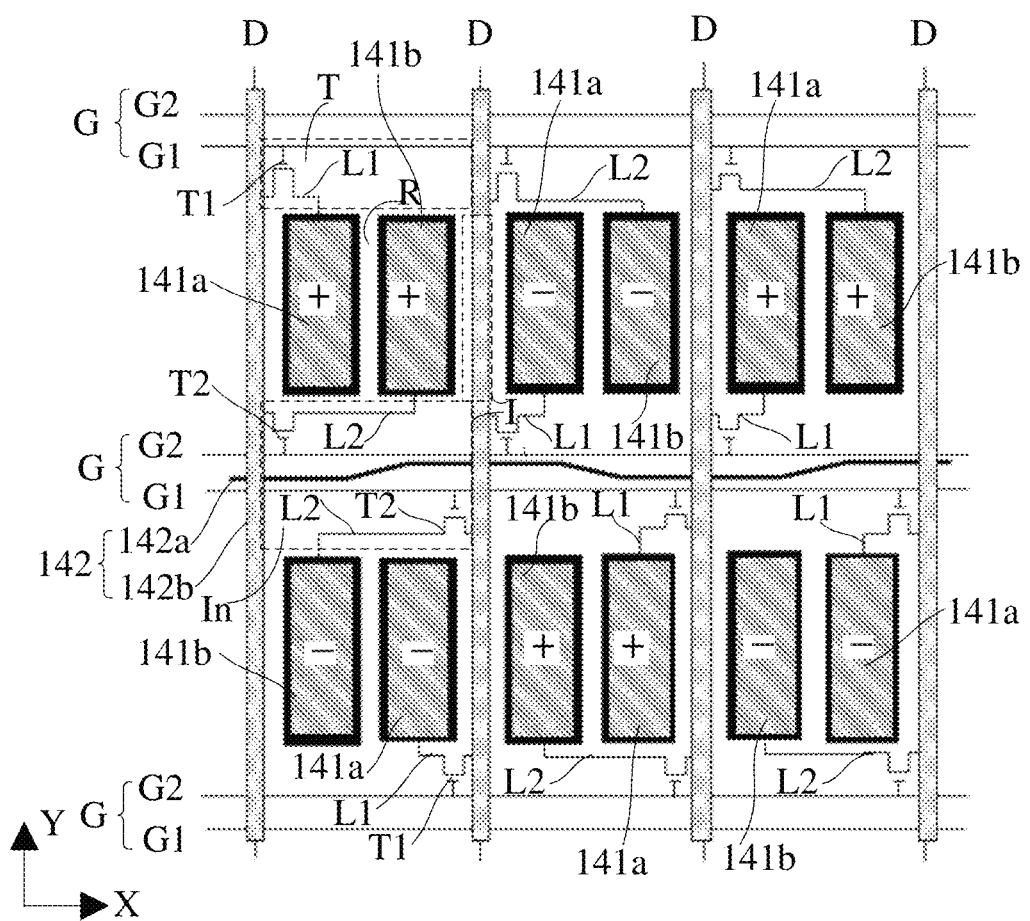
FIG. 2 is a schematic diagram showing a circuit architecture of an array substrate according to the first embodiment of the present application.
Figure 3:
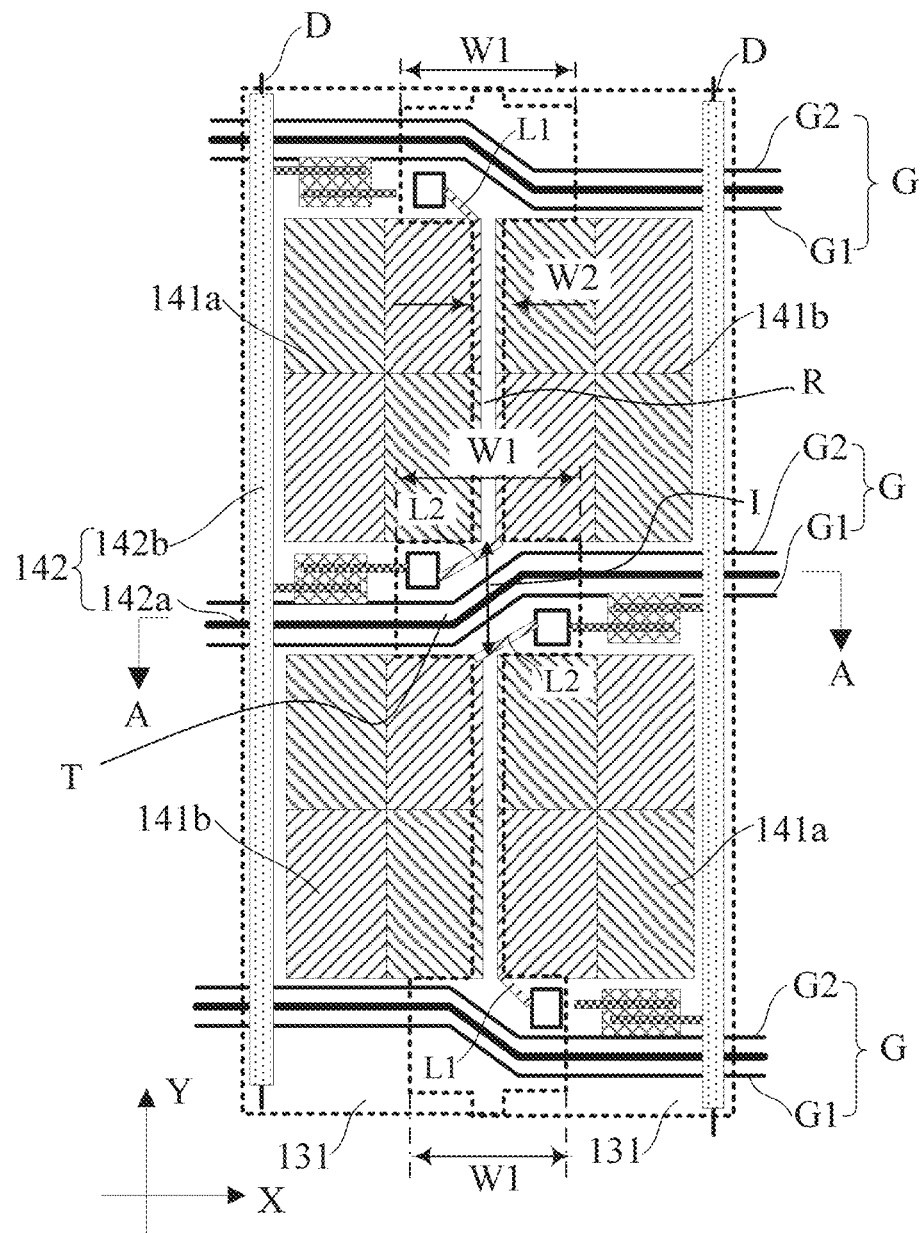
FIG. 3 is a schematic diagram showing a top view structure of the array substrate shown in FIG. 2.
Figure 4:
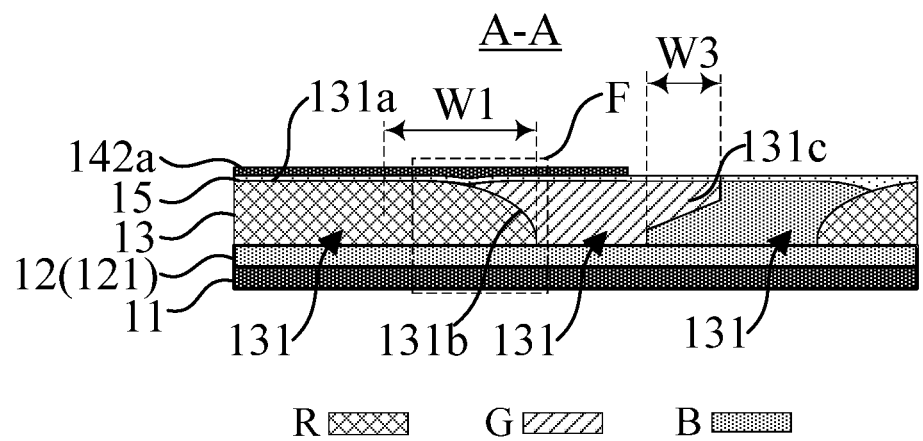
FIG. 4 shows a cross-sectional view of the array substrate of FIG. 3 along the direction A-A.

FIG. 2 shows a schematic diagram of a circuit architecture of an array substrate according to the first embodiment of the present application, FIG. 3 shows a schematic diagram of a top view structure of the array substrate shown in FIG. 2, and FIG. 4 shows a cross-sectional view of the array substrate in FIG. 3 along the direction A-A.

As shown in FIGS. 2-4, the embodiment of the present application provides an array substrate 1 comprising a driving array layer 12, a color-resistance layer 13 and a transparent metal layer 14 which are successively formed on a substrate base 11.

The driving array layer 12 comprises scanning lines G extending in a first direction X and data lines D extending in a second direction Y, the first direction X and the second direction Y intersecting each other.

The transparent metal layer 14 comprises a first pixel electrode 141a and a second pixel electrode 141b which are alternately provided along a first direction X and a second direction Y, and a shielding common electrode 142 located in an interval region In of the first pixel electrode 141a and the second pixel electrode 141b, wherein the shielding common electrode 142 comprises a transverse electrode 142a and a longitudinal electrode 142b electrically connected to each other, the longitudinal electrode 142b is provided corresponding to the data line D, and the transverse electrode 142a is provided corresponding to the scanning line G. Here, the longitudinal electrodes 142b function to shield an electric field over the data lines D, and the transverse electrodes 142a function to electrically connect a plurality of longitudinal electrodes 142b provided in parallel together. Alternatively, the material of the transparent metal layer 14 comprises a metal oxide, which may be, for example, indium tin oxide (ITO).

The color-resistance layer 13 includes color-resistance units 131 corresponding to the first pixel electrodes 141a and the second pixel electrodes 141b, respectively. In the second direction Y, in the target area T formed by the intersection of the interval I between the first pixel electrode 141a and the second pixel electrode 141b and the scanning line G, a first overlap width between two adjacent color-resistance units 131 corresponding to the target area T is greater than a second overlap width between two adjacent color-resistance units 131 at the remaining positions R.

According to the first embodiment of the present application, a Dual-gate architecture (also referred to as a Double Rate Driving (DRD)) is used as the array substrate 1, and compared with a Normal architecture, the number of the scanning line thereof is doubled while that of the data line is reduced by a fold. In the display panel, the increase of the scanning line only increases the Gate Driver on Array (GOA) driving circuit, and does not greatly increase the production cost; by doubling the number of data lines, the number of integrated chips in the source driver circuit can be halved, the amount of printed circuit board can be effectively reduced, and thus the production cost of the display panel can be greatly saved.

Specifically, as shown in FIG. 2, the first pixel electrode 141a and the second pixel electrode 141b are alternately provided in the first direction X and the second direction Y. The first pixel electrode 141a and the second pixel electrode 141b are electrically connected to the same data line D, and the second pixel electrode 141b is located on a side of the first pixel electrode 141a away from the data line D, and the forward projection of the longitudinal electrode 142b on the substrate base 11 covers the forward projection of the data line D on the substrate base 11.

Wherein the first pixel electrode 141a and the second pixel electrode 141b connected to the same data line D are a group of pixel electrode pairs with the same polarity, and are both provided on the same side of the data line D and two adjacent groups of pixel electrode pairs in the same column are respectively connected to different data lines D, and the groups of pixel electrode pairs are provided in an array in the first direction X and the second direction Y. Thus, the polarities of the pixel electrode pairs of the plurality of groups are alternately provided in the first direction X and the second direction Y by "+" and "−", so that the polarities of the pixel electrode pairs of one group are opposite to those of the pixel electrode pairs of the other groups on the upper, lower, left and right sides thereof, whereby the display quality of the display panel can be improved.

Further, the scanning line G comprises a first scanning line G1 and a second scanning line G2 which are between two adjacent rows of the first pixel electrode 141a and the second pixel electrode 141b, and the forward projection of the transverse electrode 142a on the substrate base 11 is located between the forward projection of the first scanning line G1 and the second scanning line G2 on the substrate base 11. In the second direction Y, the interval I between the first pixel electrode 141a and the second pixel electrode 141b intersects with the first scanning line G1 and the second scanning line G2 to form a target area T as described above. Wherein the data line D is not within the target area T.

Taking the array substrate 1 shown in FIG. 3 as an example, the driving array layer 12 includes a first scanning line G1 and a second scanning line G2 extending in a first direction X, and a plurality of data lines D extending in a second direction Y. The transparent metal layer 14 is further formed with a first pixel electrode 141a and a second pixel electrode 141b which are provided in an array along a first direction X and a second direction Y, and a shielding common electrode 142 which is located in an interval region In between the first pixel electrode 141a and the second pixel electrode 141b, wherein the interval region In comprises a plurality of horizontal interval regions and a plurality of vertical interval regions which are provided vertically crosswise, and the shielding common electrode 142 comprises a transverse electrode 142a and a longitudinal electrode 142b which intersect each other, and the transverse electrode 142a is located in the horizontal interval region; the longitudinal electrodes 142b are located in a vertically spaced area, and the longitudinal electrode 142b covers a corresponding data line D, and the forward projection of the transverse electrode 142a on the substrate base 11 is located between the forward projection of the first scanning line G1 and the second scanning line G2 on the substrate base 11.

In addition, in order to avoid the coupling between the first scanning line G1 and the second scanning line G2 and the opposed common electrode 23 on the side of the opposed substrate 2, which results in light leakage in the vicinity of the first pixel electrode 141a and the second pixel electrode 141b due to the disorder of the orientation of the liquid crystal molecules, a black matrix is usually required to be provided at the position of the transverse electrode 142a for shading.

Further, the first pixel electrode 141a, the second pixel electrode 141b and the color-resistance unit 131 are all rectangular, and have opposite sides parallel to the data line D and opposite sides parallel to the first scanning line G1 or the second scanning line G2. In preparing the patterned transparent metal layer 14, a Photo Resin (PR) is coated on the transparent metal layer 14 to perform an exposure process to form the first pixel electrode 141a, the second pixel electrode 141b and the shielding common electrode 142.

When PR is coated, PR tends to accumulate at the edge overlap between two adjacent color-resistance units 131, resulting in a thicker PR at the edge overlap and uneven terrain. After PR exposure, underexposed metal oxide remains at the edge overlap. Since the distance between the first pixel electrode 141a and the second pixel electrode 141b and the transverse electrode 142a is relatively close in the target area, electrical performance problems such as a short circuit or crosstalk between the first pixel electrode 141a and the second pixel electrode 141b and the transverse electrode 142a may occur, or the transverse electrode 142a cannot be electrically connected to the longitudinal electrode 142b, and the display effect of the liquid crystal display panel may be affected.

To this end, in the array substrate 1 in the embodiment of the present application, in the second direction Y, in a target area formed by the interval I between the first pixel electrode 141a and the second pixel electrode 141b intersecting with the first scanning line G1 and the second scanning line G2, a first overlap width W1 between two adjacent color-resistance units 131 corresponding to the target area is greater than a second overlap width W2 between two adjacent color-resistance units 131 at the remaining positions R.

Since the first overlap width W1 between two adjacent resistance units 131 at the target area T is increased, the difference of topography segments at the edge overlap of the two can be significantly reduced, thereby reducing the thickness of the photoresist coated at the edge position, making it easy to be sufficiently exposed and removed by developing, so that the metal oxide residue at the overlap of two adjacent resistance units 131 at the target area T can be eliminated or reduced, and the problems of short circuit and crosstalk between the first pixel electrode 141a and the second pixel electrode 141b and the transverse electrode 142a can be avoided, or the problems of poor electrical performance such as that the transverse electrode 142a cannot be electrically connected to the longitudinal electrode 142b can be avoided.

In addition, since the first overlap width W1 between two adjacent color-resistance units 131 at the target area is increased, the pixel aperture ratio can also be increased without loss of the transmittance, further improving the display effect of the liquid crystal display panel.

In an array substrate 1 according to an embodiment of the present application, by increasing the overlap width between two adjacent color-resistance units 131 in a target area formed by the interval I between a first pixel electrode 141a and a second pixel electrode 141b and a scanning line G, it is possible to avoid a metal oxide with insufficient exposure remaining at the overlapping position between two adjacent color-resistance units 131, prevent the occurrence of electrical performance poor problems such as short circuit and crosstalk of a transparent metal layer, and improve the display effect of a liquid crystal display panel.

In some embodiments, as shown in FIGS. 2 and 3, the driving array layer 12 further comprises a first thin film transistor T1 and a second thin film transistor T2, wherein the first thin film transistor T1 and the second thin film transistor T2 are both provided close to the data line D, the first scanning line G1 is electrically connected to the gate electrode of the first thin film transistor T1, and the second scanning line G2 is electrically connected to the gate electrode of the second thin film transistor T2.

The first pixel electrode 141a is electrically connected to the drain electrode of the first thin film transistor T1 via a first wire L1, and the second pixel electrode 141b is electrically connected to the drain electrode of the second thin film transistor T2 via a second wire L2. The overlapping area corresponding to the target area between two adjacent color-resistance units 131 also covers two adjacent first wires L1 or two adjacent second wires L2. The length of the first wire L1 is less than the length of the second wire L2.

In addition, the first metal layer 121 further includes gates of the first thin film transistor T1 and the second thin film transistor T2, and the second metal layer 122 further includes sources and drains of the first thin film transistor T1 and the second thin film transistor T2. The driving array layer 12 further includes a gate insulating layer and an active layer formed on the first metal layer 121 and a Passivation (PV) 15 formed on the second metal layer 122.

In an interval region In between two adjacent rows of the first pixel electrodes 141a and the second pixel electrodes 141b, two adjacent first wires L1 or two adjacent second wires L2 and the transverse electrodes 142a are relatively close to each other and are both located in the target region as previously described. In order to prevent problems such as short-circuiting, cross-talk, etc. of the adjacent two first wires L1 or the adjacent two second wires L2 and the transverse electrode 142a in the target area due to the metal oxide remaining above the color-resistance layer 13, the overlapping area corresponding to the target area between the adjacent two color-resistance units 131 also covers the adjacent two first wires L1 or the adjacent two second wires L2.

In some embodiments, the transverse electrode 142a of the shielding common electrode 142 includes a straight line portion L extending in the first direction X and an oblique line portion M between two adjacent first wires L1 or two adjacent second wires L2. Thus, the overlapping area corresponding to the target region between two adjacent color-resistance units 131 also covers at least the oblique line portion M.

As shown in FIG. 3, the shape of the transverse electrode 142a includes a straight line portion L and an oblique line portion M, and the oblique line portion M can avoid the first wires L1 of the adjacent two rows of the first pixel electrodes 141a or the second wires L2 of the adjacent two rows of the second pixel electrodes 141b, to prevent the transverse electrode 142a from overlapping with the first pixel electrodes 141a or the second pixel electrodes 141b to form signal interference. In addition, the overlapping area corresponding to the target area between the gradient portions 131b of two adjacent resistance units 131 can cover the oblique line portion M and part of the straight line portion L, to prevent the metal oxide which is under-exposed from remaining in the vicinity of the oblique line portion M of the transverse electrode 142a after PR exposure, resulting in the problem of short circuit and crosstalk between the first pixel electrode 141a, the second pixel electrode 141b and the transverse electrode 142a in the target area, or to avoid the problem of poor electrical performance such as the transverse electrode 142a being unable to electrically connect with the longitudinal electrode 142b.

In some embodiments, the color-resistance unit 131 is a bar-shaped structure extending in the second direction Y, which includes a flat portion 131a extending in its length direction and a gradient portion 131b located on one side in the width direction of the flat portion 131a, the thickness of the gradient portion 131b being gradually reduced in the direction away from the flat portion 131a, and in the second direction Y, two adjacent color-resistance units 131 are overlapped with each other corresponding to the target area by the gradient portion 131b.

As shown in FIG. 4, the color-resistance unit 131 comprises a red color-resistance unit R, a green color-resistance unit G and a blue color-resistance unit B, wherein an overlapping area between the red color-resistance unit R and the green color-resistance unit G covers a target area as previously stated, i.e., a target area T formed by an interval between a first pixel electrode 141a and a second pixel electrode 141b intersecting a first scanning line G1 and a second scanning line G2. The overlapping area between the green color-resistance unit G and the blue color-resistance unit B covers the data line D. The color-resistance unit 131 includes a flat portion 131*a* extending in its length direction and a gradient portion 131*b* located on one side in the width direction of the flat portion 131*a*, and two adjacent color-resistance units 131 overlap each other corresponding to a target area through the gradient portion 131*b*.

Since in the first direction X, the width of the color-resistance unit 131 is greater than the spacing distance between the adjacent two longitudinal electrodes 142*b*. That is, the space between the vertical electrode 142*b* and the pixel electrode is located on the flat portion 131*a* of the color-resistance unit 131. Therefore, in the photolithography process of manufacturing the transparent metal layer 14, the metal oxide residue does not easily occur between the vertical electrode 142*b* and the first pixel electrode 141*a* or the second pixel electrode 141*b*. That is, in the second direction Y, at the remaining position R outside the target area, the second overlap width W2 between two adjacent color-resistance units 131 can be made smaller.

However, at the target area, since the first overlap width W1 between two adjacent color-resistance units 131 is increased, the region with a lower topography formed at the overlap of the slope portions 131*b* of the two color-resistance units 131 is increased, and the region with a lower topography is even nearly filled, so that the metal oxide residue at the overlap of two adjacent color-resistance units 131 can be eliminated or reduced, and the problems of short circuit and crosstalk between the first pixel electrode 141*a* and the second pixel electrode 141*b* and the transverse electrode 142*a* can be avoided, or the problems of poor electrical performance such as that the transverse electrode 142*a* cannot be electrically connected to the longitudinal electrode 142*b* can be avoided.

Figure 5:
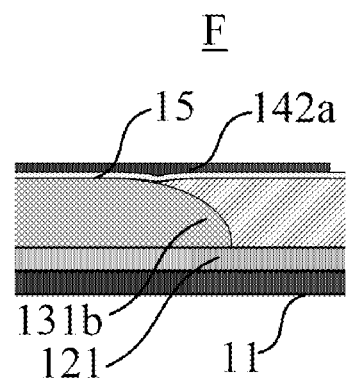
FIG. 5 shows a partially enlarged structural view of the region F in FIG. 4.

FIG. 5 shows a partially enlarged structural view of the region F in FIG. 4.

As shown in FIGS. 4 and 5, the driving array layer 12 comprises a first metal layer 121 located on the substrate base 11, a second metal layer 122 located on and insulated from the first metal layer 121, wherein the first metal layer 121 is formed with a first scanning line G1, a second scanning line G2 and an array common electrode 121*a*, and the second metal layer 122 is formed with a data line D. After the array substrate 1 and the opposed substrate 2 are abutted to form a liquid crystal panel, the array common electrode 121*a* is electrically connected to the whole opposite common electrode 23 on the opposed substrate.

Since the minimum overlap width of two adjacent resistance units 131, the respective single-side production accuracy, the counterpoint production accuracy between the resistance units 131 and the first metal layer 121, and the production accuracy of the gradient portions 131*b* of the two resistance units 131, etc. all affect the first overlap width W1, in order to more comprehensively regulate the first overlap width W1 between the two adjacent resistance units 131 at the target area, a variety of factors affecting the overlap width can be calculated using a root mean square calculation method.

Specifically, in the second direction Y, the first overlap width W1 between two adjacent color-resistance units 131 satisfies the following condition:

$$W1 = \sqrt{A1^2 + A2^2 + B1^2 + B2^2 + C1^2 + C2^2 + D^2} \quad (1)$$

In formula (1), A1 and A2 are respectively a single-side production accuracy of two adjacent resistance units 131, B1 and B2 are respectively an counterpoint production accuracy of the two adjacent resistance units 131 and the first metal layer 121, C1 and C2 are respectively a production accuracy of slope portion 131*b* of the two adjacent resistance units 131, and D is a minimum overlap width between the two adjacent resistance units 131.

Since there is no need to adjust the relative positions of the color-resistance unit 131 and the first metal layer 121 in the second direction Y. However, in the first direction X, the counterpoint production accuracy of the resistance unit 131 and the first metal layer 121 needs to be adjusted. In one example, the counterpoint production accuracy between two adjacent color-resistance units 131 and the first metal layer 121 is B1=B2=±3 microns (μm), respectively.

In one example, the single-side production accuracy for each of two adjacent color-resistance units 131 is A1=A2=+1.5 μm. In one example, the minimum width of the gradient portions 131*b* of two adjacent color-resistance units 131 is C1=C2=0.5 μm. In one example, the minimum overlap width D=1.5 μm between two adjacent color-resistance units 131.

In some embodiments, the first overlap width W1 is greater than 5 μm. In some embodiments, the second overlap width W2 ranges from W2=3.5 μm to 5 μm. The inventors have found through calculation and practical verification that the color-resistance unit 131 satisfying the above-mentioned first overlap width W1 and second overlap width W2 can eliminate or reduce the metal oxide residue at the overlap, the problems of short circuit and crosstalk between the first pixel electrode 141*a* and the second pixel electrode 141*b* and the transverse electrode 142*a* can be avoided, or the problems of poor electrical performance such as that the transverse electrode 142*a* cannot be electrically connected to the longitudinal electrode 142*b* can be avoided.

In some embodiments, the color-resistance unit 131 further comprises a convex portion 131*c* located on the other side in the width direction of the flat portion 131*a*, and in the second direction Y, the two adjacent color-resistance units 131 overlap each other via the convex portion 131*c*, and the forward projection of the overlapping area on the substrate base 11 covers the forward projection of the data line D on the substrate base 11, and the third overlap width W3 and the second overlap width W2 between the two adjacent color-resistance units 131 are equal.

As shown in FIG. 4, as described above, in the first direction X, the width of the color-resistance unit 131 is greater than the spacing distance between the adjacent two longitudinal electrodes 142*b*. That is, the vertical electrode 142*b* and the first and second pixel electrodes 141*a* and 141*b* are located on the flat portion 131*a* of the color-resistance unit 131. Therefore, in the photolithography process of manufacturing the transparent metal layer 14, the metal oxide residue does not easily occur between the vertical electrode 142*b* and the first pixel electrode 141*a* and the second pixel electrode 141*b*. That is, in the second direction Y, the third overlap width W3 between two adjacent color-resistance units 131 can be made smaller.

Further, in order to simplify the manufacturing process, the third overlap width W3 is equal to the second overlap width W2. For example, the third overlap width W3 ranges from W3=3.5 μm to 5 μm.

In some embodiments, in the second direction Y, cross sections of the convex portions 131*c* of two adjacent color-resistance units 131 in the thickness direction thereof is in a shape of a right triangle or a right trapezoid, and a straight edge of one of the convex portions 131*c* is provided flush with the flat portion 131*a*.

As shown in FIG. 5, the convex portions 131c of two adjacent resistance units 131 have a right-angled trapezoidal cross-section along the thickness direction thereof, and the straight line side of the left-side convex portion 131c is provided flush with the flat portion 131a, and the oblique line side of the left-side convex portion 131c and the oblique line side of the right-side convex portion 131c are attached to each other, so that the topography of the resistance units 131 is kept flat, the flatness of the transparent metal layer 14 is improved, the metal oxide having insufficient exposure is prevented from remaining during the photolithography process for manufacturing the transparent metal layer 14, the occurrence of short circuits, crosstalk and other poor electrical performance problems are avoided, and the display effect of the liquid crystal display panel is improved.

Embodiment II

Figure 6:
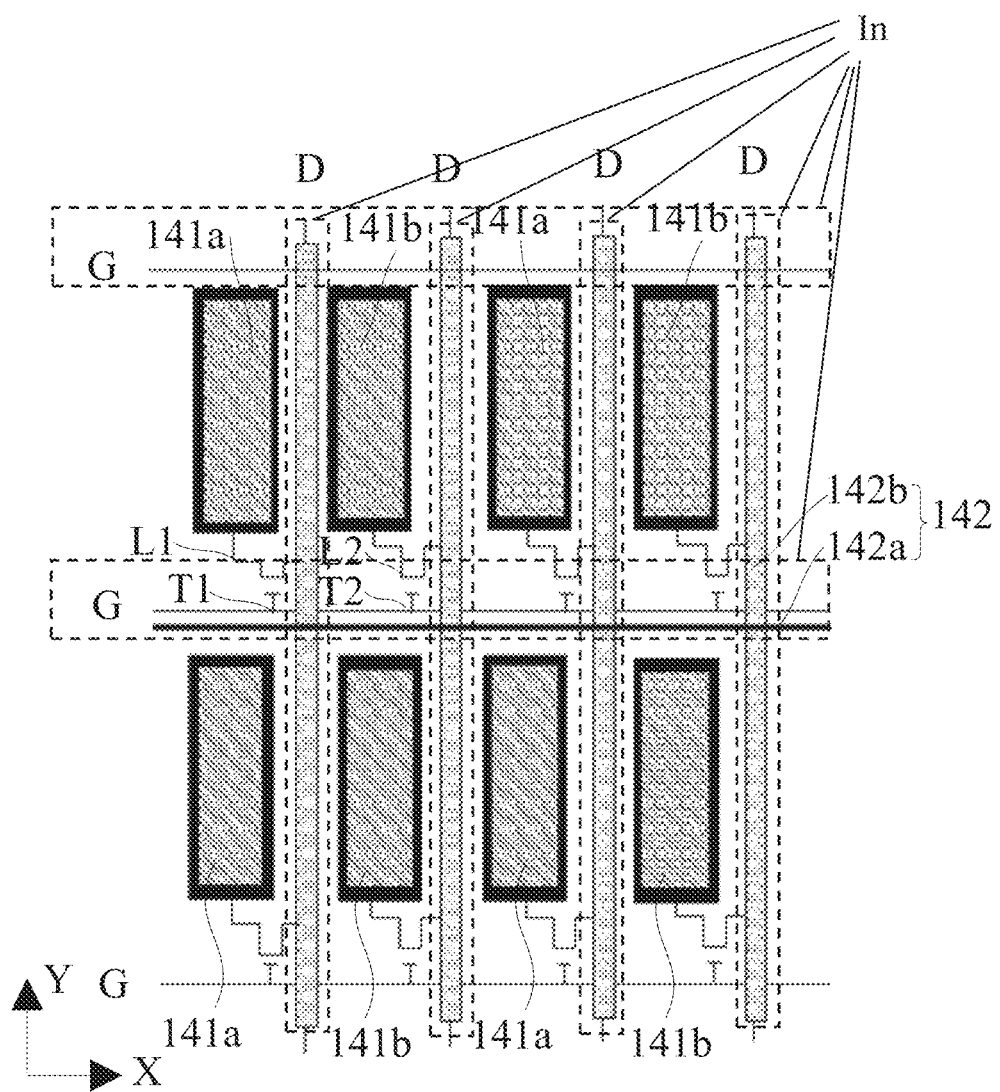
FIG. 6 is a schematic diagram showing a circuit architecture of an array substrate according to the second embodiment of the present application.
Figure 7:
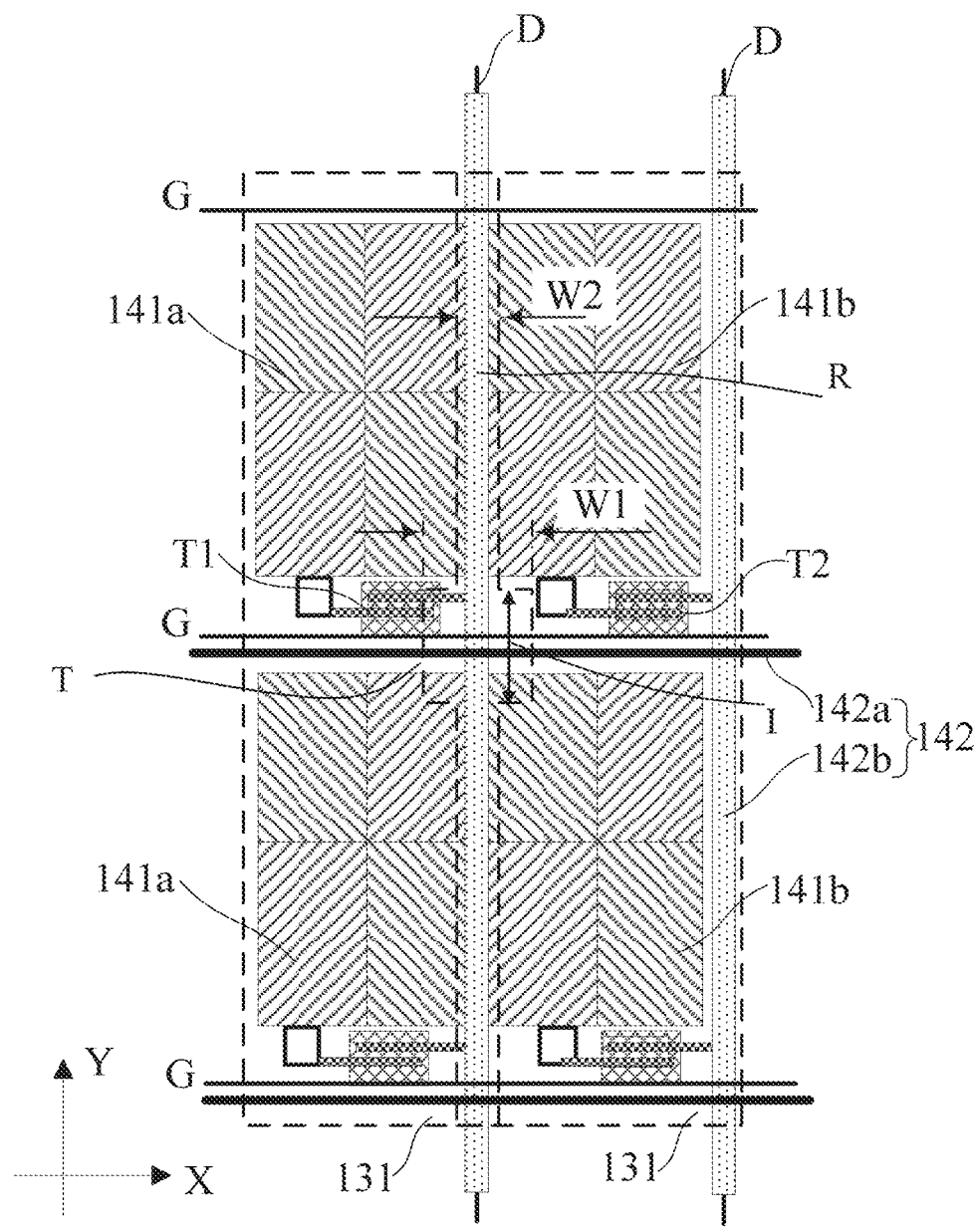
FIG. 7 is a schematic diagram showing a top view structure of the array substrate shown in FIG. 6.

FIG. 6 is a schematic diagram showing circuit architecture of an array substrate according to the second embodiment of the present application, and FIG. 7 is a schematic diagram showing a top view structure of the array substrate shown in FIG. 6.

As shown in FIG. 6, the embodiment of the present application further provides an array substrate 1 of a liquid crystal display panel, which is structurally similar to the array substrate 1 of the first embodiment, except that the array substrate 1 adopts a Normal architecture, scanning lines G extending in a first direction X and data lines D extending in a second direction Y intersect each other to define a plurality of sub-pixels Px, and the number of the scanning lines G is the same as the number of the data lines D. Accordingly, the overlapping positions corresponding to the target area between two adjacent color-resistance units 131 are different.

Specifically, the first pixel electrode 141a and the second pixel electrode 141b are respectively electrically connected to two adjacent and different data lines D; the forward projection of the longitudinal electrode 142b on the substrate base covers the forward projection of the data line D on the substrate base 11, the transverse electrode 142a is located between two adjacent rows of the first pixel electrode 141a and the second pixel electrode 141b, and the transverse electrode 142a is provided parallel to the scanning line G.

Further, as shown in FIG. 6, the driving array layer 12 also comprises a first thin film transistor T1 and a second thin film transistor T2, wherein the first thin film transistor T1 and the second thin film transistor T2 are both provided close to the data line D, the first pixel electrode 141a is electrically connected to the drain electrode of the first thin film transistor T1 via a first wire L1, and the second pixel electrode 141b is electrically connected to the drain electrode of the second thin film transistor T2 via a second wire L2. The scanning line G is electrically connected to the gate electrode of the first thin film transistor T1 and the gate electrode of the second thin film transistor T2, respectively. The length of the first wire L1 is equal to the length of the second wire L2.

The color-resistance layer 13 comprises color-resistance units 131 respectively corresponding to the first pixel electrode 141a and the second pixel electrode 141b, and in the second direction Y, a first overlap width between two adjacent color-resistance units 131 in a target area T formed by an interval I between the first pixel electrode 141a and the second pixel electrode 141b intersecting with the scanning line G is greater than a second overlap width between two adjacent color-resistance units 131 in the remaining positions R. A portion of the data line D is located within the target area T.

Taking the array substrate 1 shown in FIG. 6 as an example, the driving array layer 12 comprises a plurality of scanning lines G extending in a first direction X and a plurality of data lines D extending in a second direction Y, wherein the scanning lines G and the data lines D are provided to intersect each other to define a plurality of sub-pixels Px.

The transparent metal layer 14 comprises a first pixel electrode 141a and a second pixel electrode 141b which are provided in an array along a first direction X and a second direction Y, and a shielding common electrode 142 which is located in an interval region In between the first pixel electrode 141a and the second pixel electrode 141b, wherein the interval region In comprises a plurality of horizontal interval regions and a plurality of vertical interval regions which are provided by vertical intersection, the shielding common electrode 142 comprises a transverse electrode 142a and a longitudinal electrode 142b which are electrically connected, and the transverse electrode 142a is located in the horizontal interval region; the longitudinal electrodes 142b are located in a vertically spaced area, and the longitudinal electrode 142b covers a corresponding data line D, and a transverse electrode 142a is formed between two adjacent rows of first pixel electrodes 141a and second pixel electrodes 141b.

The longitudinal electrodes 142b function to shield an electric field over the data lines D, and the transverse electrodes 142a function to connect a plurality of longitudinal electrodes 142b provided in parallel together. In addition, in order to prevent the scanning line G from being coupled with the opposed common electrode 23 on the side of the opposed substrate 2, which results in light leakage in the vicinity of the first pixel electrode 141a and the second pixel electrode 141b due to the disorder of the orientation of the liquid crystal molecules, a black matrix is usually required to be provided at the position of the transverse electrode 142a for shading.

Further, in the target area T in the second direction Y, at the intersection position of the transverse electrode 142a and each data line D, the first overlap width W1 between two adjacent color-resistance units 131 is greater than the second overlap width W2 between two adjacent color-resistance units 131 at the remaining positions R.

Since the first overlap width W1 between two adjacent color-resistance units 131 is increased at the intersection of the transverse electrode 142a and the data line D, the topographic segment difference at the edge overlap of the two color-resistance units 131 can be significantly reduced, thereby reducing the thickness of the photoresist coated at the edge position, making it easy to be sufficiently exposed and removed by developing, so that the metal oxide residue at the overlap of two adjacent resistance units 131 can be eliminated or reduced, and the problems of short circuit and crosstalk between the first pixel electrode 141a and the second pixel electrode 141b and the transverse electrode 142a can be avoided, or the problems of poor electrical performance such as that the transverse electrode 142a cannot be electrically connected to the longitudinal electrode 142b can be avoided.

In addition, since the first overlap width between two adjacent color-resistance units 131 is increased, the pixel aperture ratio can also be increased without loss of the transmittance, further improving the display effect of the liquid crystal display panel.

In some embodiments, the color-resistance unit 131 is a bar-shaped structure extending in the second direction Y, which includes a flat portion 131a extending in its length direction and a gradient portion 131b located on one side in the width direction of the flat portion 131a, the thickness of the gradient portion 131b being gradually reduced in the direction away from the flat portion 131a, and in the second direction, two adjacent color-resistance units 131 are overlapped with each other corresponding to the target area by the gradient portion 131b.

Since the minimum overlap width of two adjacent resistance units 131, the respective single-side production accuracy, the counterpoint production accuracy between the resistance units 131 and the first metal layer 121, and the production accuracy of the gradient portions 131b of the two resistance units 131, etc. all affect the first overlap width W1, in order to regulate the first overlap width W1 between two adjacent resistance units 131 at the intersection of the transverse electrode 142a and the data line more comprehensively, a variety of factors affecting the overlap width can be calculated using a root mean square calculation method.

Specifically, in the second direction Y, the first overlap width W1 between two adjacent color-resistance units 131 satisfies the following condition:

$$W1 = \sqrt{A1^2 + A2^2 + B1^2 + B2^2 + C1^2 + C2^2 + D^2} \quad (1)$$

In formula (1), A1 and A2 are respectively a single-side production accuracy of two adjacent resistance units 131, B1 and B2 are respectively an counterpoint production accuracy of the two adjacent resistance units 131 and the first metal layer 121, C1 and C2 are respectively a production accuracy of slope portion 131b of the two adjacent resistance units 131, and D is a minimum overlap width between the two adjacent resistance units 131.

Since there is no need to adjust the relative positions of the color-resistance unit 131 and the first metal layer 121 in the direction parallel to the longitudinal electrodes 142b. In the direction parallel to the transverse electrode 142a, the counterpoint production accuracy of the resistance unit 131 and the first metal layer 121 needs to be adjusted. In one example, the counterpoint production accuracy between two adjacent color-resistance units 131 and the first metal layer 121 is B1=B2=±3 μm, respectively.

In one example, the single-side production accuracy for each of two adjacent color-resistance units 131 is A1=A2=±1.5 μm. In one example, the minimum width of the gradient portions 131b of two adjacent color-resistance units 131 is C1=C2=0.5 μm. In one example, the minimum overlap width D=1.5 μm between two adjacent color-resistance units 131.

In some embodiments, the first overlap width W1 is greater than 5 μm. In some embodiments, the second overlap width W2 ranges from W2=3.5 μm to 5 μm. The calculation and practical verification, the inventors found that the color-resistance unit 131 satisfying the above-mentioned first overlap width W1 and second overlap width W2 can eliminate or reduce the metal oxide residue at the overlap, avoid the problem of short circuit and crosstalk between the pixel electrode and the transverse electrode 142a, or avoid the problem of poor electrical performance, such as the transverse electrode 142a being unable to electrically connect with the longitudinal electrode 142b.

Embodiment III

Figure 8:
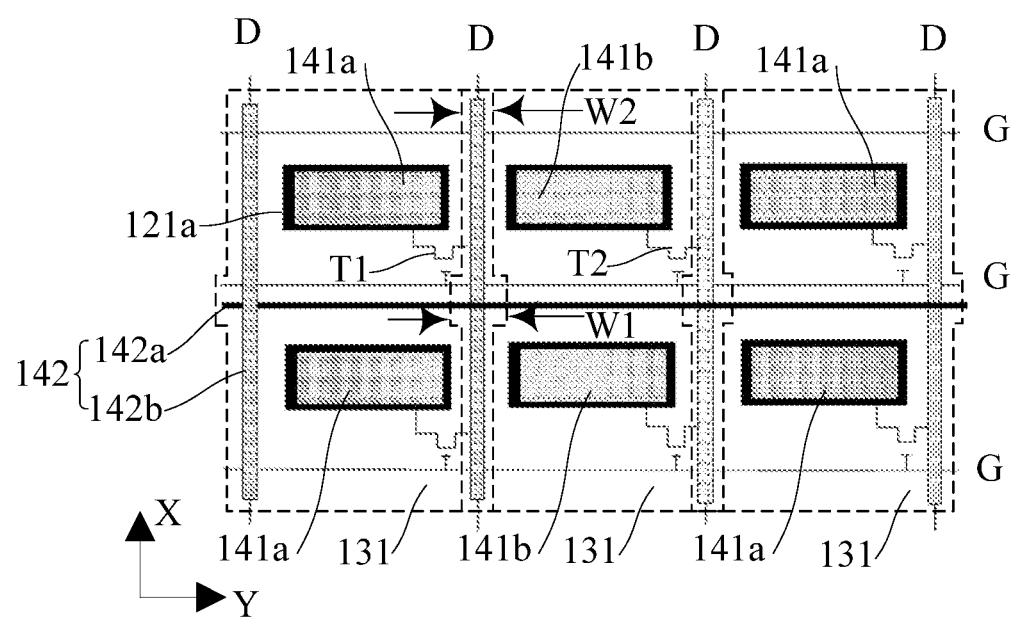
FIG. 8 shows a schematic circuit architecture of an array substrate according to the third embodiment of the present application.

FIG. 8 is a schematic diagram showing a top view structure of an array substrate according to the third embodiment of the present application.

As shown in FIG. 8, the embodiment of the present application further provides an array substrate 1 of a liquid crystal display panel, which is similar to the structure of the second embodiment, with the difference that the array substrate 1 adopts a Tri-gate structure, and compared with a Normal structure, the number of scanning lines G of the triple-grid structure is three times as much as that of the original structure, while the number of data lines D is reduced by ⅓ of the original structure. In the display panel, the increase of the scanning line only increases the Gate Driver on Array (GOA) driving circuit, and does not greatly increase the production cost; and the data line D is reduced by ⅓ of the original, so that the number of integrated chips in the source driving circuit is reduced by ⅔, and the amount of the printed circuit board can be effectively reduced, and thus the production cost of the display panel can be greatly saved.

Specifically, as shown in FIG. 8, in addition to the number of scanning lines G and data lines D being different from the number of scanning lines G and data lines D in a normal architecture, the first row of scanning lines G of the triple grid architecture of the array substrate 1 is redundant; in addition, the first pixel electrode 141a and the second pixel electrode 141b have a rectangular shape, and the length and width directions thereof are rotated by 90 degrees in comparison with the pixel electrode of the normal structure.

The color-resistance layer 13 comprises color-resistance units 131 respectively corresponding to a first pixel electrode 141a and a second pixel electrode 141b, wherein in a second direction Y, in a target area formed by an interval I between the first pixel electrode 141a and the second pixel electrode 141b intersecting with the scanning line G, a first overlap width W1 between two adjacent color-resistance units 131 is greater than a second overlap width W2 between two adjacent color-resistance units 131 at the remaining positions R.

Since the calculation method of the first overlap width W1 is identical to that of the first embodiment and the second embodiment described above, it will not be described again here.

It can be understood that the technical solution of the array substrate 1 provided by the embodiments of the present application can be widely used for various liquid crystal display panels, such as a Twisted Nematic (TN) display panel, an In-Plane Switching (IPS) display panel, a Vertical Alignment (VA) display panel, and a Multi-Domain Vertical Alignment (MVA) display panel.

It should be readily understood that "on", "above", and "over" in this application should be interpreted in the broadest manner so that "on" does not only mean "directly on", but also includes the meaning of "on something" with intervening features or layers in between, and "above" or "over" does not include the meaning of "on something" or "over something", but may include the meaning of "on something" or "over something" without intervening features or layers in between (i.e. directly on something).

As used herein, the term "substrate base" refers to a material upon which a subsequent layer of material is added. The substrate base itself may be patterned. The material added on top of the substrate base may be patterned or may remain unpatterned. In addition, the substrate base may comprise a wide range of materials, such as silicon, germanium, gallium arsenide, indium phosphide, and the like. Alternatively, the substrate base may be made of a non-conductive material (e.g. a glass, plastic, or sapphire wafer, etc.).

As used herein, the term "layer" may refer to a portion of material that includes a region having a thickness. The layer may extend over the entire underlying or overlying structure, or may have a smaller extent than that of the underlying or overlying structure. In addition, a layer may be a region of a continuous structure that is homogeneous or heterogeneous and has a thickness that is less than the thickness of the continuous structure. For example, a layer may be located between the top and bottom surfaces of the continuous structure or between any pair of transverse planes at the top and bottom surfaces. The layers may extend laterally, vertically and/or along a tapered surface. The substrate base can be a layer, can include one or more layers therein, and/or can have one or more layers thereon, above, and/or below. The layer may comprise a plurality of layers. For example, the interconnect layer may include one or more conductors and contact layers (within which contacts, interconnect lines, and/or holes are formed) and one or more dielectric layers.

Finally, the above embodiments are only used to illustrate the technical solution of the present application, and not to limit the same; while the application has been described in detail and with reference to the foregoing embodiments, it will be understood by a person skilled in the art that: the technical solutions described in the foregoing embodiments may still be modified, or some or all of the technical features may be equivalently replaced; and these modifications or substitutions do not depart from the spirit of the corresponding technical solutions of the embodiments of the present application.

What is claimed is:

1. An array substrate, comprising a driving array layer, a color-resistance layer and a transparent metal layer successively formed on a substrate base; the driving array layer comprising a scanning line extending along a first direction and a data line extending along a second direction, and the first direction and the second direction intersecting each other; the transparent metal layer comprising a first pixel electrode and a second pixel electrode which are alternately provided along the first direction and the second direction; wherein the transparent metal layer further comprises a shielding common electrode located in an interval region of the first pixel electrode and the second pixel electrode, the shielding common electrode comprises a transverse electrode and a longitudinal electrode which are electrically connected to each other, the longitudinal electrode is provided corresponding to the data line, and the transverse electrode is provided corresponding to the scanning line; and the color-resistance layer comprises color-resistance units respectively corresponding to the first pixel electrode and the second pixel electrode; in the second direction, in a target area formed by an interval between the first pixel electrode and the second pixel electrode intersecting with a scanning line, a first overlap width between two adjacent color-resistance units corresponding to the target area is greater than a second overlap width between two adjacent color-resistance units at remaining positions.

2. The array substrate according to claim 1, wherein the color-resistance unit is a strip-like structure extending in the second direction, and comprises a flat portion extending in a length direction thereof and a gradient portion on a width direction side of the flat portion, a thickness of the gradient portion being gradually reduced in a direction away from the flat portion, and in the second direction, two adjacent color-resistance units are overlapped with each other by the gradient portion corresponding to the target area.

3. The array substrate according to claim 2, wherein the driving array layer comprises a first metal layer on the substrate base, and the first metal layer is formed with the scanning line;

in the second direction, the first overlap width between two adjacent color-resistance units is W1, and W1 satisfies the following condition:

$$W1 = \sqrt{A1^2 + A2^2 + B1^2 + B2^2 + C1^2 + C2^2 + D^2},$$

wherein A1 and A2 are respectively single-side production accuracy of two adjacent color-resistance units, B1 and B2 are respectively counterpoint production accuracy of the two adjacent color-resistance units and the first metal layer, C1 and C2 are respectively production accuracy of the slope parts of the two adjacent color-resistance units, and D is the minimum overlap width between the two adjacent color-resistance units.

4. The array substrate according to claim 3, wherein the respective single-side production accuracy of two adjacent color-resistance units are respectively A1=A2=±1.5 μm;

and/or the counterpoint production accuracy of two adjacent color-resistance units and the first metal layer are respectively B1=B2=±3 μm;

and/or a minimum width of the gradient of two adjacent color-resistance units is C1=C2=0.5 μm;

and/or a minimum overlap width between the two adjacent color block units is D=1.5 μm.

5. The array substrate according to claim 2, wherein the color-resistance unit further comprises a convex portion located at the other side in the width direction of the flat portion, in the second direction, two adjacent color-resistance units overlap each other via the convex portion, and a forward projection of an overlapping area on the substrate base covers a forward projection of the data line on the substrate base, and a third overlap width between the two adjacent color-resistance units is equal to the second overlap width.

6. The array substrate according to claim 1, wherein the driving array layer further comprises a first thin film transistor and a second thin film transistor which are both provided close to the data line, the first pixel electrode is electrically connected to the drain electrode of the first thin film transistor via a first wire, and the second pixel electrode is electrically connected to the drain electrode of the second thin film transistor via a second wire; and an overlapping area corresponding to the target area between two adjacent color-resistance units covers two adjacent first wires or two adjacent second wires.

7. The array substrate according to claim 6, wherein the transverse electrode comprises a straight line portion and an oblique line portion, the straight line portion extends in the first direction, the oblique line portion is located between two adjacent first wires or between two adjacent second wires.

8. The array substrate according to claim 1, wherein the first pixel electrode and the second pixel electrode are electrically connected to the same data line, and the second pixel electrode is located at a side of the first pixel electrode away from the data line;

the scanning line comprises a first scanning line and a second scanning line which are provided at intervals between two adjacent rows of the first pixel electrode and the second pixel electrode, and the forward projection of the transverse electrode on the substrate base is located between the forward projection of the first scanning line and the second scanning line on the substrate base; and in the second direction, an interval between the first pixel electrode and the second pixel electrode intersects with the first scanning line and the second scanning line to form the target area.

9. The array substrate according to claim 8, wherein the first pixel electrode and the second pixel electrode connected to the same data line are a group of pixel electrode pairs with the same polarity, and are located on the same side of the data line; two adjacent groups of the pixel electrode pairs in the same column are respectively connected to different the data lines, and multiple groups of the pixel electrode pairs are provided in an array in the first direction and the second direction.

10. The array substrate according to claim 1, wherein the first pixel electrode and the second pixel electrode are respectively electrically connected to two adjacent and different data lines; the transverse electrode is located between two adjacent rows of the first pixel electrode and the second pixel electrode, and the transverse electrode is provided parallel to the scanning line.

11. The array substrate according to claim 1, wherein the first overlap width $W1>5$ μm.

12. The array substrate according to claim 1, wherein the second overlap width $W2$ is 3.5 μm to 5 μm.

13. The array substrate according to claim 5, wherein the third overlap width $W3$ is 3.5 μm to 5 μm.

14. The array substrate according to claim 5, wherein in the second direction, cross sections of the convex portions of two adjacent color-resistance units in a thickness direction thereof is in a shape of a right triangle or a right trapezoid, and a straight edge of one of the convex portions is provided flush with the flat portion.

15. A liquid crystal display panel, comprising:
the array substrate of claim 1;
an opposed substrate provided opposite to the array substrate; and
a liquid crystal layer provided between the array substrate and the opposed substrate.

* * * * *